(12) United States Patent
Egnor (10) Patent No.: US 8,856,143 B2
(45) Date of Patent: *Oct. 7, 2014

(54) CLASSIFICATION OF AMBIGUOUS GEOGRAPHIC REFERENCES

(75) Inventor: Daniel Egnor, New York, NY (US)

(73) Assignee: Google Inc., Mountain View, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/627,870

(22) Filed: Nov. 30, 2009

(65) Prior Publication Data

US 2010/0076985 A1 Mar. 25, 2010

Related U.S. Application Data

(63) Continuation of application No. 11/024,785, filed on Dec. 30, 2004, now Pat. No. 7,716,162.

(51) Int. Cl.
*G06F 17/30* (2006.01)

(52) U.S. Cl.
CPC ...... *G06F 17/30613* (2013.01); *G06F 17/3087* (2013.01); *Y10S 707/99935* (2013.01)
USPC ............. 707/749; 707/E17.046; 707/999.005

(58) Field of Classification Search
CPC combination set(s) only.
See application file for complete search history.

(56) References Cited

U.S. PATENT DOCUMENTS

| | | | |
|---|---|---|---|
| 5,257,242 A | 10/1993 | Clawson | |
| 5,960,435 A * | 9/1999 | Rathmann et al. | 1/1 |
| 5,995,929 A * | 11/1999 | Gupta | 704/251 |
| 6,006,321 A * | 12/1999 | Abbott | 712/43 |
| 6,078,618 A * | 6/2000 | Yokoyama et al. | 375/240 |
| 6,675,159 B1 * | 1/2004 | Lin et al. | 1/1 |
| 6,691,105 B1 * | 2/2004 | Virdy | 1/1 |
| 6,694,311 B1 * | 2/2004 | Smith | 1/1 |
| 6,778,995 B1 | 8/2004 | Gallivan | |
| 6,865,295 B2 * | 3/2005 | Trajkovic | 382/170 |
| 6,865,567 B1 | 3/2005 | Oommen et al. | |
| 6,904,409 B1 | 6/2005 | Lambert et al. | |
| 7,340,460 B1 * | 3/2008 | Kapur et al. | 1/1 |
| 7,483,881 B2 | 1/2009 | Egnor et al. | |
| 7,716,162 B2 * | 5/2010 | Egnor | 707/724 |

(Continued)

FOREIGN PATENT DOCUMENTS

| | | |
|---|---|---|
| JP | 06-075995 A | 3/1994 |
| WO | WO 01/63479 A1 | 8/2001 |
| WO | WO 2004/084099 A2 | 3/2004 |
| WO | WO 2004/053771 | 6/2004 |

OTHER PUBLICATIONS

Hideki Kawai et al., Development and Evaluation of a Mobile Search Engine With Air, Search Report of Information Processing Society of Japan, Sep. 10, 2001, vol. 2001, No. 86, pp. 71-76 (2001-FI-64-11), includes partial translation.

(Continued)

*Primary Examiner* — Shyue Jiunn Hwa
(74) *Attorney, Agent, or Firm* — Harrity & Harrity, LLP (57) ABSTRACT

A location classifier generates location information based on textual strings in input text. The location information defines potential geographical relevance of the input text. In determining the location information, the location classifier may receive at least one geo-relevance profile associated with at least one string in the input text, obtain a combined geo-relevance profile for the document from the at least one geo-relevance profile, and determine geographical relevance of the input text based on the combined geo-relevance profile.

20 Claims, 12 Drawing Sheets

(56) References Cited

U.S. PATENT DOCUMENTS

| | | | |
|---|---|---|---|
| 2001/0011270 A1 | 8/2001 | Himmelstein et al. | |
| 2003/0055815 A1 | 3/2003 | Chender et al. | |
| 2003/0069880 A1* | 4/2003 | Harrison et al. | 707/3 |
| 2003/0182171 A1 | 9/2003 | Vianello | |
| 2004/0133927 A1 | 7/2004 | Sternberg et al. | |
| 2004/0205461 A1 | 10/2004 | Kaufman et al. | |
| 2004/0236730 A1 | 11/2004 | Frank | |
| 2005/0187823 A1 | 8/2005 | Howes | |
| 2005/0197894 A1* | 9/2005 | Fairbanks et al. | 705/14 |

OTHER PUBLICATIONS

Daniel Egnor, co-pending U.S. Appl. No. 11/024,785, filed Dec. 30, 2004, entitled "Classification of Ambiguous Geographic References".

International Search Report for PCT/US2005/047211 mailed May 26, 2006.

Office Action from Korean Patent Application No. 10-2007-7017505, dated May 12, 2009, 13 pages.

Office Action issued in related Korean Application 10-2007-7017505 on Aug. 2, 2012, six pages.

* cited by examiner

CLASSIFICATION OF AMBIGUOUS GEOGRAPHIC REFERENCES

RELATED APPLICATION

This application is a continuation of U.S. application Ser. No. 11/024,785, filed Dec. 30, 2004, the entire contents of which is incorporated herein by reference.

BACKGROUND

A. Field of the Invention

Systems and methods described herein relate to search engines and, more particularly, to techniques for classifying text as relevant to geographic regions.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page.

Local search engines are search engines that attempt to return relevant web pages within a specific geographic region. When indexing documents for a local search engine, it is desirable to be able to, when appropriate, automatically associate documents, or sections of documents, with specific geographic regions. For example, a web page about a restaurant in New York City should be associated with New York City. In many cases, geographically specific web pages include postal addresses or other geographic information that unambiguously associates the web page with the geographic region. In other cases, however, the web page may be related to a specific geographic region but yet may include only partial postal address information or include other terms that may not be easily recognized as being associated with a specific geographic location. This makes it difficult to determine the geographic region with which the web page is associated.

SUMMARY OF THE INVENTION

One aspect of the invention is directed to a method of determining geographical relevance of a document. The method includes receiving at least one geo-relevance profile associated with at least one string in the document, obtaining a combined geo-relevance profile for the document from the at least one geo-relevance profile, and determining geographical relevance of the document based on the combined geo-relevance profile.

Another aspect of the invention is directed to a computer-readable medium that contains programming instructions for execution by a processor. The computer-readable medium includes programming instructions for receiving geo-relevance profiles associated with respective strings in a document, the geo-relevance profiles each defining the geographical relevance of the string with respect to geographical regions. The computer-readable medium further includes programming instructions for determining geographical relevance of the document based on the geo-relevance profiles.

Yet another aspect of the invention is directed to a method for generating a geo-relevance profile for a string. The method includes determining a plurality of sections of training text in which each section of training text is associated with a geographical region, accumulating occurrences of the string in the plurality of selections of training text, and generating the geo-relevance profile as a histogram based on the accumulated occurrences of the string.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

Figure 1:
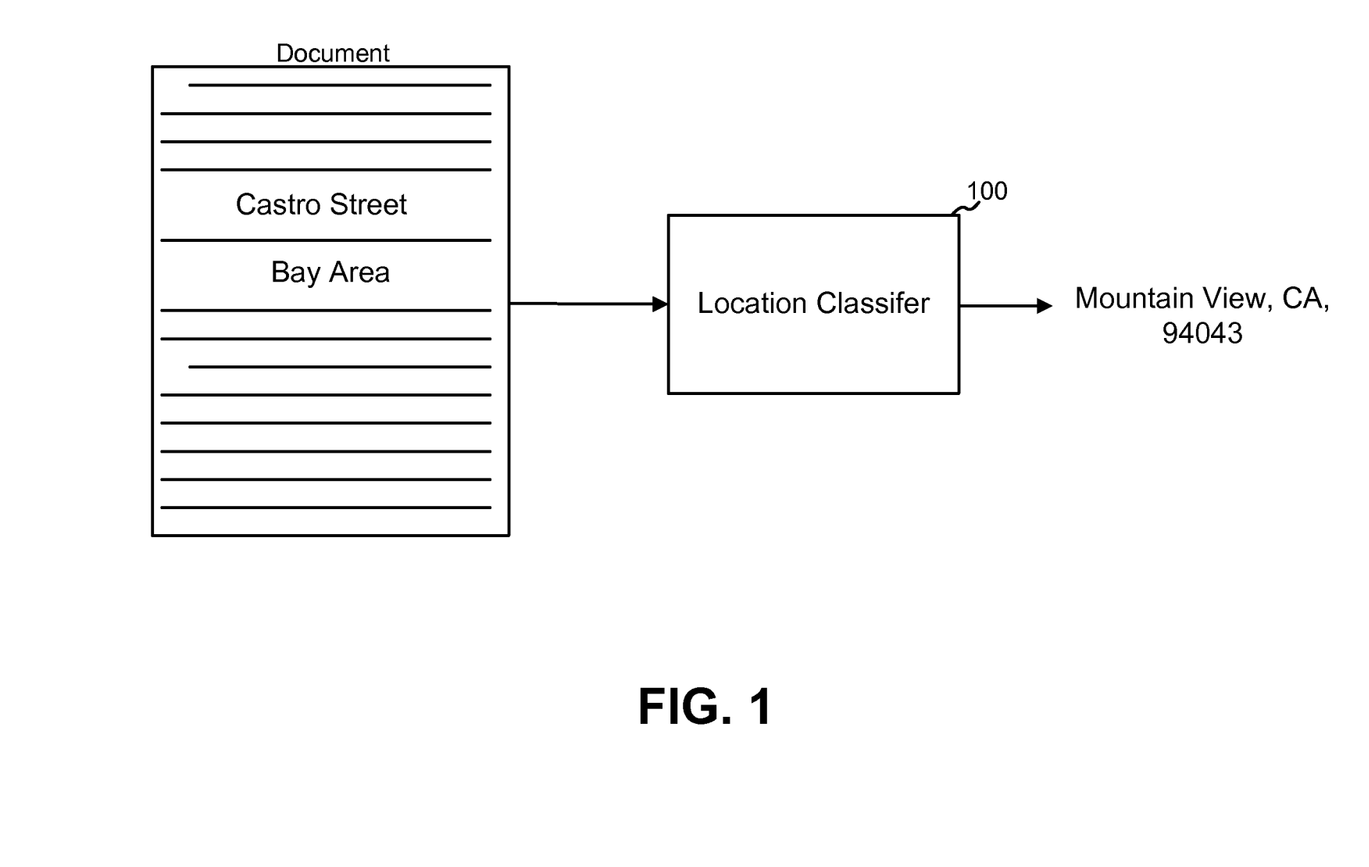
FIG. 1 is a diagram illustrating general concepts consistent with aspects of the invention.

A location classifier is described herein that automatically classifies input text, when appropriate, to specific geographic regions(s). FIG. 1 is a diagram illustrating general concepts consistent with aspects of the invention, including a location classifier 100. As an example of the operation of location classifier 100, consider an input document, such as the exemplary document shown in FIG. 1, describing a business on Castro Street in Mountain View, Calif. Assume that the document describes the business as being on Castro Street in the bay area, but does not specifically include a full postal address, telephone number, and never explicitly states "Mountain View, Calif."

Location classifier 100 may recognize that the bi-grams "bay area" and "Castro Street" in the document are geographically significant. "Bay area," by itself, is frequently used to refer to the area surrounding the San Francisco bay in California, but it is also commonly used to refer to other bay locations, such as the Green Bay area in Wisconsin. Additionally, Castro Street, by itself, may be a common street name. Location classifier 100 may resolve the individual geographical ambiguity in "Bay Area" and "Castro Street" by recognizing that the occurrence of both of these phrases is likely to indicate that the document pertains to the Castro Street located in Mountain View, Calif.

Location classifier 100 may then generate a complete address or other location identifier, such as Mountain View, Calif., 94043, as potentially corresponding to the business mentioned in the document.

Exemplary Network Overview

Figure 2:
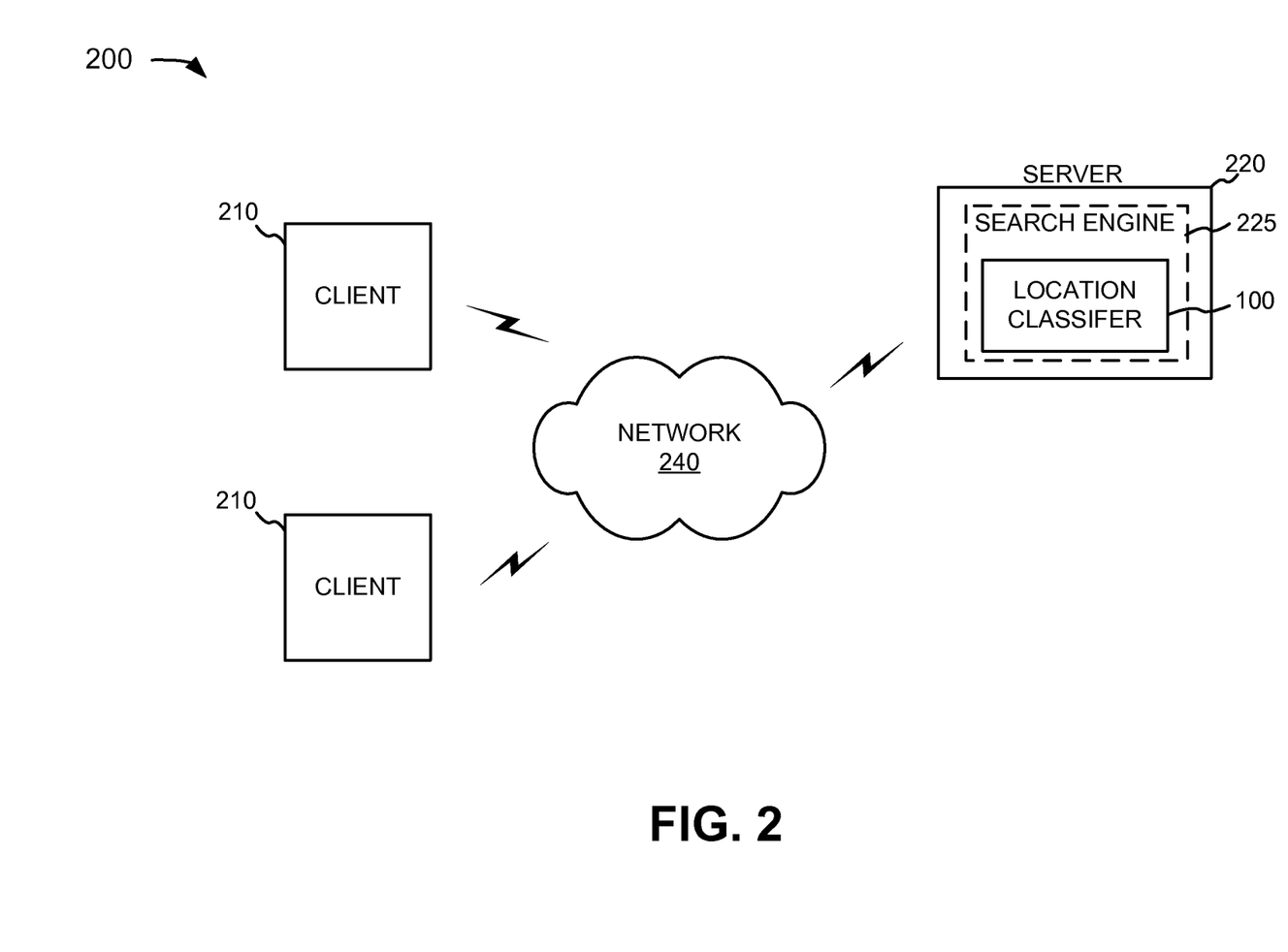
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform the functions of a server and a server may perform the functions of a client.

A client 210 may include a device, such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents. Clients 210 and server 220 may connect to network 240 via wired, wireless, or optical connections.

Server 220 may include a search engine 225 usable by clients 210. Search engine 225 may be a search engine, such as a query-based document search engine. In some implementations, search engine 225 may particularly be designed to return results local to geographic regions. Search engine 225 may include location classifier 100. Location classifier 100 receives input data that may include partial addresses or terms/phrases having geographic relevance and may generate one or more location identifiers corresponding to geographic areas that correspond to the input documents. Location classifier 100 may, for instance, be used by search engine 225 to associate documents, such as web pages, with geographic areas or to determine whether a user search query relates to a specific geographic location.

A document, as the term is used herein, is to be broadly interpreted to include any machine-readable and machine-storable work product. A document may be an e-mail, a search query, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as JavaScript, etc.).

Exemplary Client/Server Architecture

Figure 3:
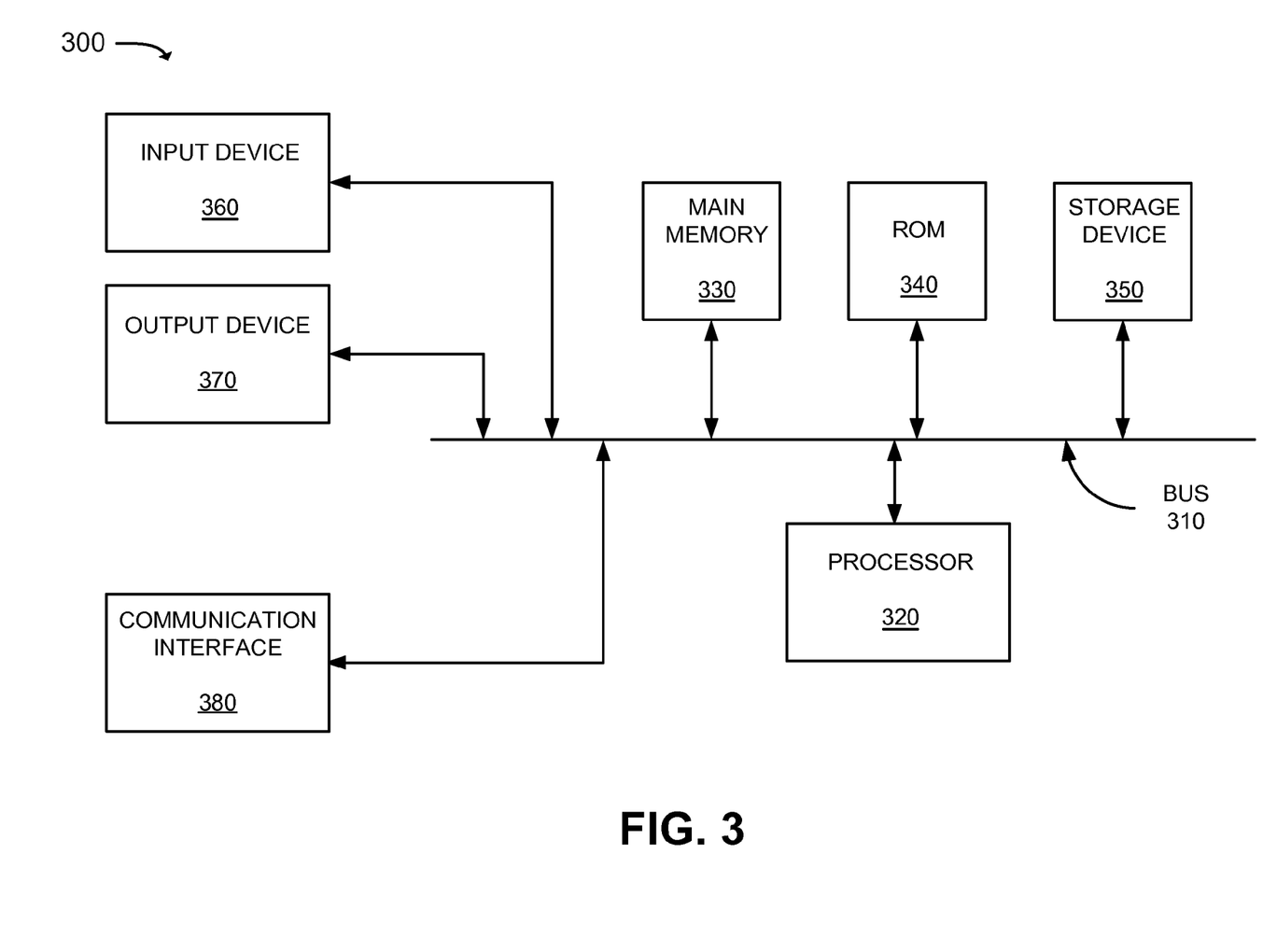
FIG. 3 is an exemplary diagram of a client or server shown in FIG. 2.

FIG. 3 is an exemplary diagram of a client 210 or server 220, referred to as computing device 300, according to an implementation consistent with the principles of the invention. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of conventional processor, microprocessor, or processing logic that may interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include a conventional mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

Server 220, consistent with the principles of the invention, performs certain searching or document retrieval related operations through search engine 225 and/or location classifier engine 100. Search engine 225 and/or location classifier engine 100 may be stored in a computer-readable medium, such as memory 330. A computer-readable medium may be defined as one or more physical or logical memory devices and/or carrier waves.

The software instructions defining search engine 225 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Training of Location Classifier 100

Location classifier 100 may automatically generate geographic location information for an input document or section of a document. Before location classifier 100 can generate the geographic location information, it may be trained on a number of training documents. In one implementation, the documents may be web pages.

Figure 4:
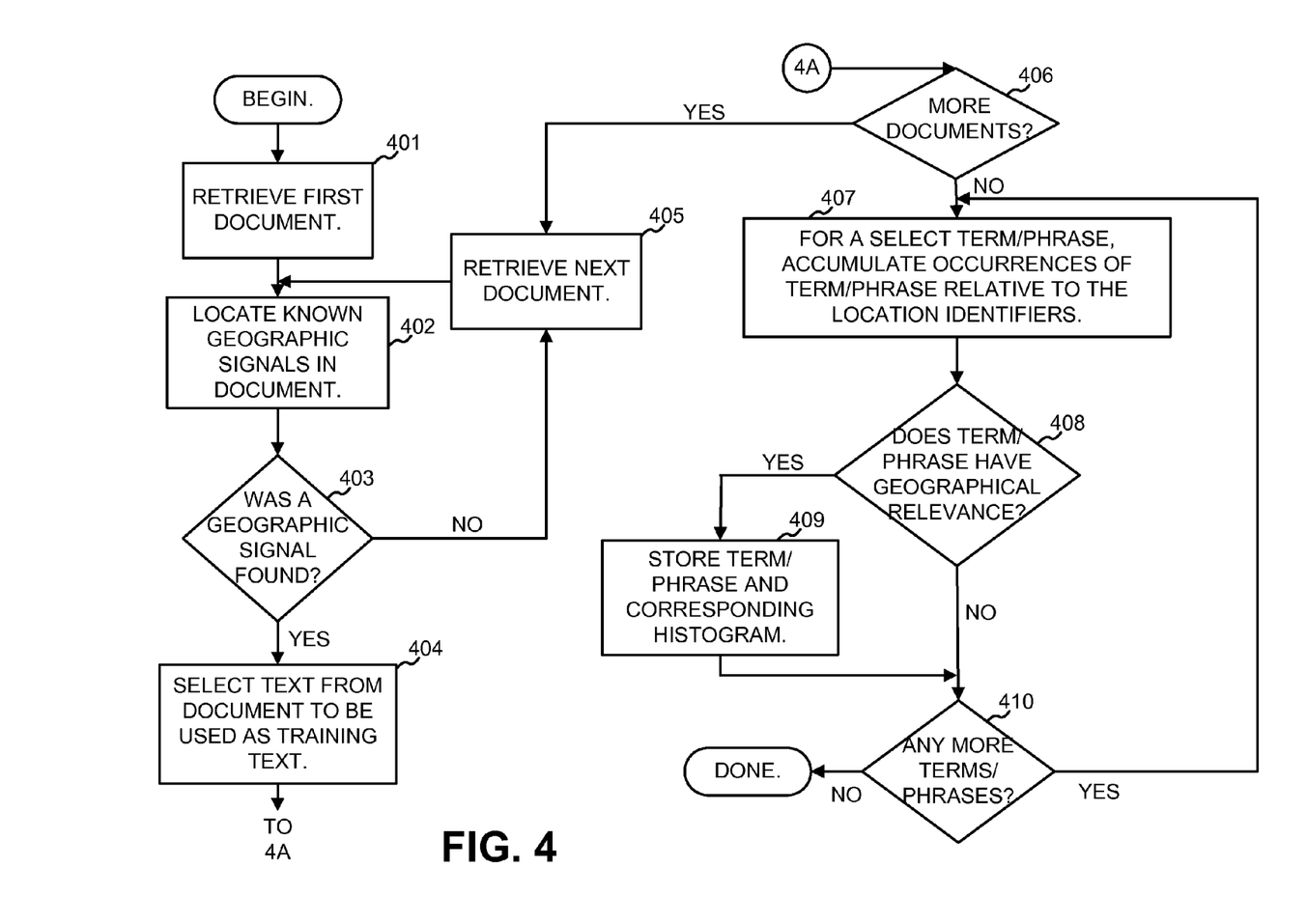
FIG. 4 is a flow chart illustrating an exemplary procedure for training the location classifier engine shown in FIGS. 1 and 2.

FIG. 4 is a flow chart illustrating exemplary procedures for training location classifier 100.

Location classifier 100 may be trained on a large number of documents, such as a large number of web documents. Location classifier engine 100 may begin training by retrieving a first of the documents, (act 401), and locating known geographic signals within the document (act 402). A known geographic signal may include, for example, a complete address that unambiguously specifies a geographic location. The geographic signal can be located by, for example, pattern matching techniques that look for sections of text that are in the general form of an address. For example, location classifier engine 100 may look for zip codes as five digit integers located near a state name or state abbreviation and street names as a series of numerals followed by a string that includes a word such as "street," "st.," "drive," etc. In this manner, location classifier 100 may locate the known geographic signals as sections of text that unambiguously reference geographic addresses.

Figure 5:
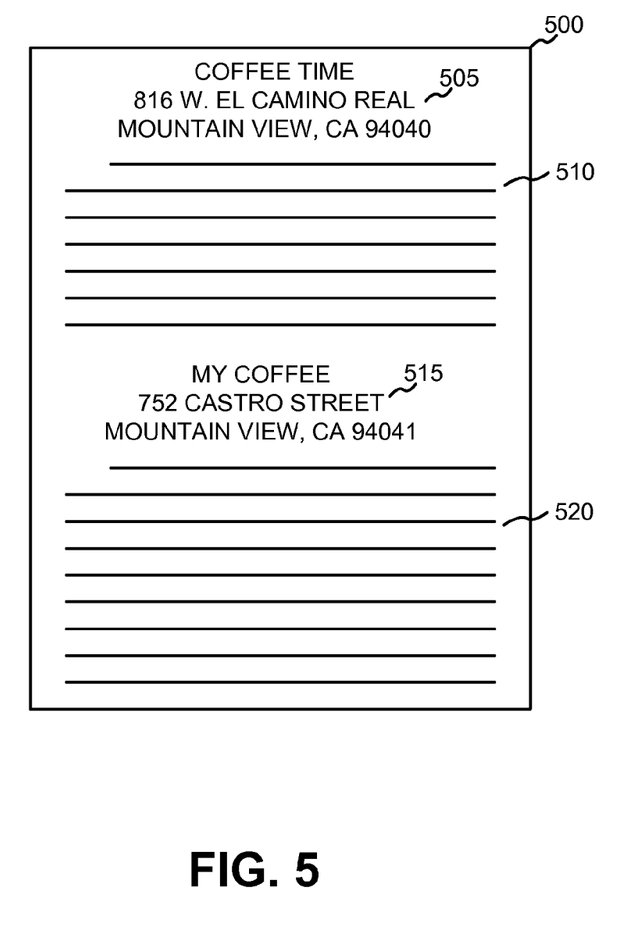
FIG. 5 is a diagram illustrating an exemplary document in which two geographic signals are present.

FIG. 5 is a diagram illustrating an exemplary document 500 in which two geographic signals are present. As shown, document 500 includes a first geographic signal 505, a paragraph of text 510, a second geographic signal 515, and a second paragraph of text 520.

The first geographic signal, signal 505, is for a hypothetical coffee shop called "Coffee Time" that specifies, as a standard postal address, the location of Coffee Time. Location classifier 100 may recognize this address as a valid address based both on the structure of the address and/or based on the fact that the zip code, street name, and city name are all consistent with a known location in California. Similarly, location classifier 100 may recognize that geographic signal 515 also represents a valid address that is unambiguously associated with a physical location. One of ordinary skill in the art will recognize that other techniques for determining whether a document is associated with a geographic location can be used, such as manual classification of documents.

Documents that are determined to be associated with valid geographic signals in act 402 are assumed to be documents that correspond to a known geographic region(s). If the document currently being processed is not such a document, such as a web document that is not associated with a particular geographic region, the next document may be processed (acts 403 and 405). For documents that include valid geographic signals, however, location classifier 100 may select text from the document to be used as training text associated with the found geographic signal(s) (act 404).

The text selected in act 404 as the training text associated with the document may be selected in a number of different ways. For example, a fixed window (e.g., a 100 term window) around each geographic signal may be selected as the training text. In other implementations, the whole document may be selected. In still other implementations, documents with multiple geographic signals may be segmented based on visual breaks in the document and the training text taken from the segments. For the document shown in FIG. 5, for instance, paragraph 510 may be associated with address signal 505 and paragraph 520 may be associated with address signal 515.

Figure 6:
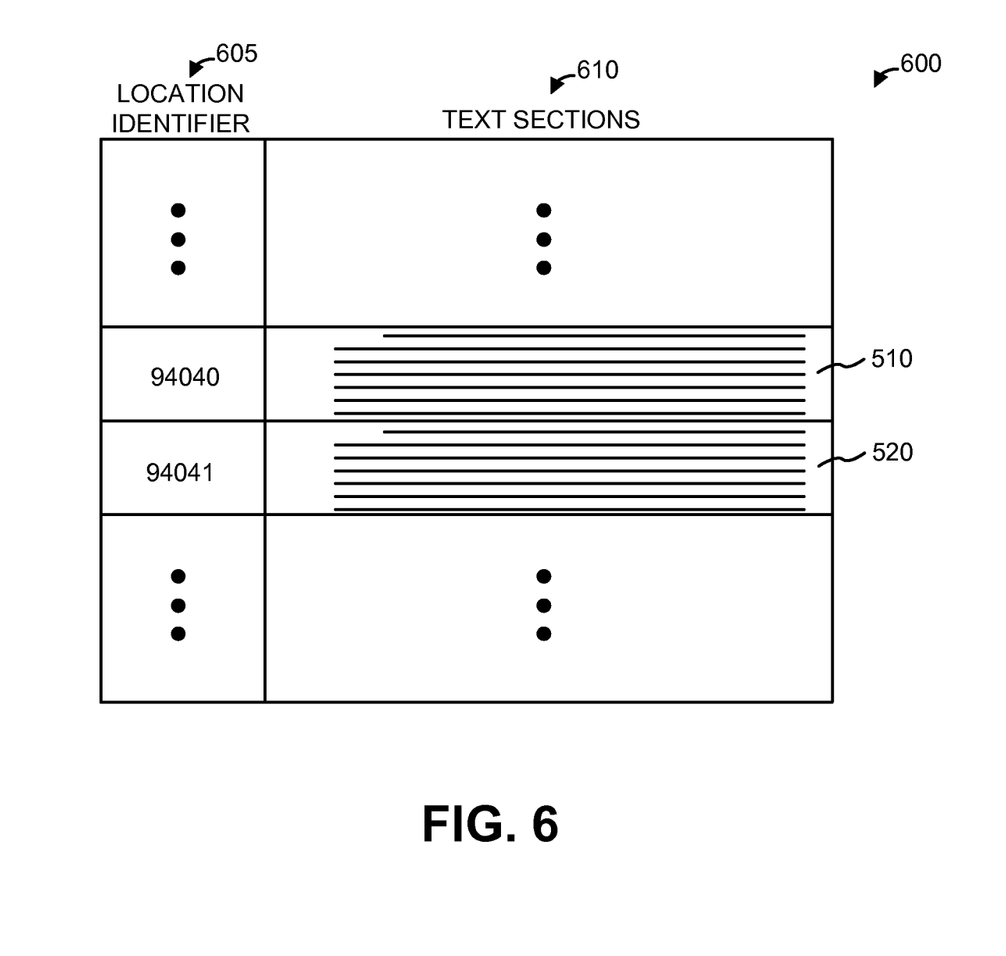
FIG. 6 is a diagram of a portion of an exemplary table illustrating training data.

Acts 402-405 may be repeated for each document in the corpus of documents that are to be used as training documents (act 406). In general, acts 401-405 serve to generate training data in which each of a number (usually a large number) of known locations are associated with text. FIG. 6 is a diagram of a portion of a table illustrating exemplary training data generated in acts 402-405. Table 600 may include a number of location identifier fields 605 and corresponding sections of text 610. Identifier fields 605 may be based on the geographic signals and text sections 610 may include the text selected for each geographic signal. Thus, each located geographic signal may correspond to an entry in table 600.

In one implementation, location identifier fields 605 may include the zip codes corresponding to the geographic signals identified in act 402. Zip codes are particularly useful to use as an identifier for a geographic location because zip codes that are close to one another numerically tend to correspond to locations that are close to one another geographically. Location identifiers other than zip codes may, however, also be used.

Two entries are particularly shown in table 600. These two entries correspond to the two geographic signals from document 500. The first entry includes the zip code 94040 as the located identifier and paragraph 510 as the selected text. The second entry includes the zip code 94041 as the located identifier and paragraph 520 as the selected text.

Although the training data in table 600 is described herein as being generated by location classifier 100 in a same process as the rest of the training (i.e., acts 407-410), the training data could be generated ahead of time or by another component or device.

Consistent with an aspect of the invention, location classifier 100 operates, in part, on the premise that text in a document that is in the vicinity of a geographic signal is biased towards using terms or phrases that relate to the geographic signal. The training data obtained in acts 401-406 may be further processed by location classifier 100, as will be described below with reference to acts 407-410, to obtain geo-relevance profiles for certain terms/phrases.

Location classifier 100 may begin by accumulating, for a select term or phrase, all occurrences of the term/phrase (also referred to as a textual strings or just strings herein) in the text selections 610 relative to the location identifiers for which the term/phrase occurs (act 407). In other words, location classifier 100 may generate a histogram relating the number of occurrences of the term/phrase to the location identifiers. The histogram will also be referred to herein as the geo-relevance profile of the term/phrase.

Figure 7A:
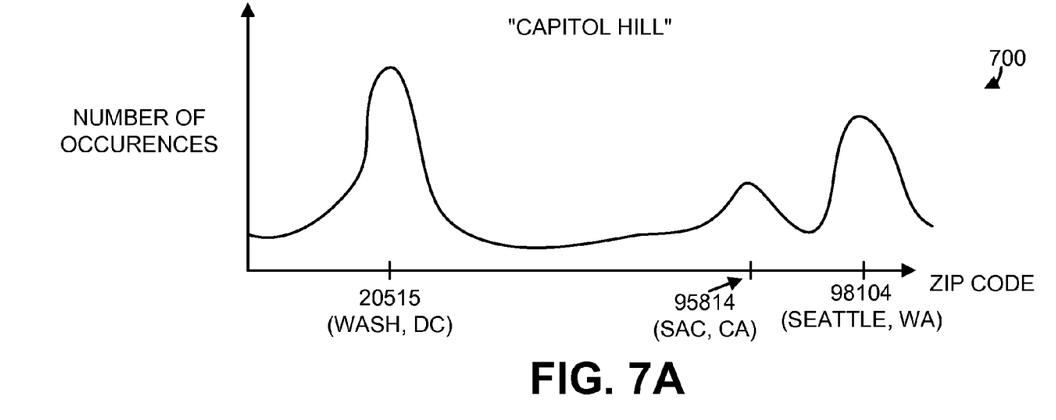
FIGS. 7A-7C are diagrams illustrating exemplary geo-relevance profiles for terms/phrases.

FIG. 7A is a diagram illustrating an exemplary histogram 700 for the bi-gram "capitol hill." As shown, the histogram includes three dominant peaks, a large peak centered in the vicinity of zip code 20515, which corresponds to the "Capitol Hill" area in Washington, D.C., a relatively small peak centered in the vicinity of zip code 95814, which corresponds to the "Capitol Hill" area in Sacramento, Calif., and a moderate peak centered in the vicinity of zip code 98104, which corresponds to the "Capitol Hill" area in Seattle, Wash. Although text selections 610 potentially included numerous references to "capitol hill," many of which were associated with areas not in the vicinity of Washington, D.C., Sacramento, or Seattle, histogram 700 illustrates that overall, "capitol hill" tends to be used when referring to one of these three locations. Washington, D.C., which corresponds to the largest peak, can be interpreted as the most likely geographic region intended by a person using the phrase "capitol hill."

Figure 7B:
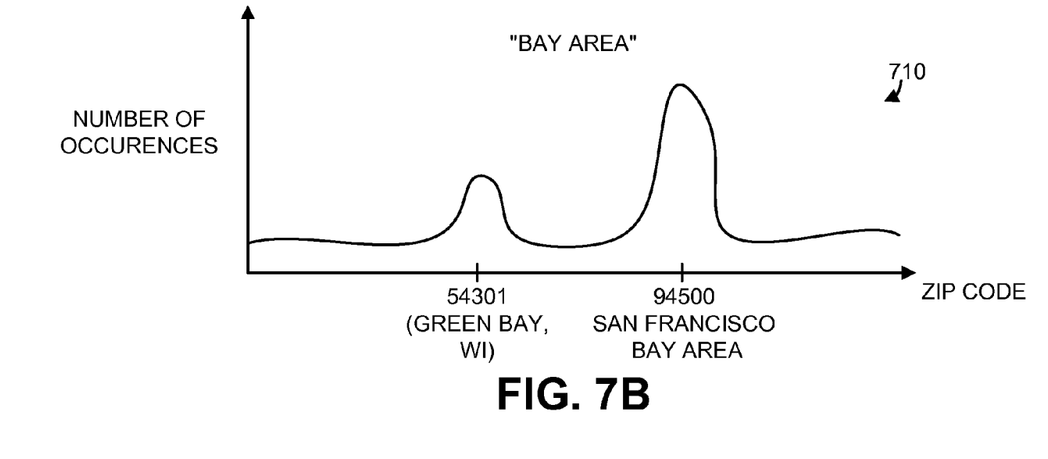

FIG. 7B is a diagram illustrating another exemplary histogram, histogram 710, for the bi-gram "bay area." Histogram 710 includes two peaks, a smaller one centered around the Green Bay, Wis., area, and a larger peak defining the San Francisco, Calif., bay area.

Location classifier 100 may perform act 407 for some or all of the terms/phrases occurring in text selections 610. In one implementation, location classifier 100 may generate a histogram for all the bi-grams (two word phrases) that occur in text 610. In other implementations, histograms may also be generated for longer phrases or single terms.

Certain occurrences of terms/phrases may be ignored when accumulating occurrences of terms/phrases. Some boilerplate language may occur frequently in a set of training documents, although the boilerplate language is not necessarily relevant for determining geographical relevance. Accordingly, in some implementations, terms to left and/or right of a select term/phrase may also be examined, and the term/phrase accumulated only when these terms are different than previous instances of the terms to the left or right of the term/phrase. Thus, if a term/phrase does not occur in a legitimate new context, it may be ignored.

Figure 7C:
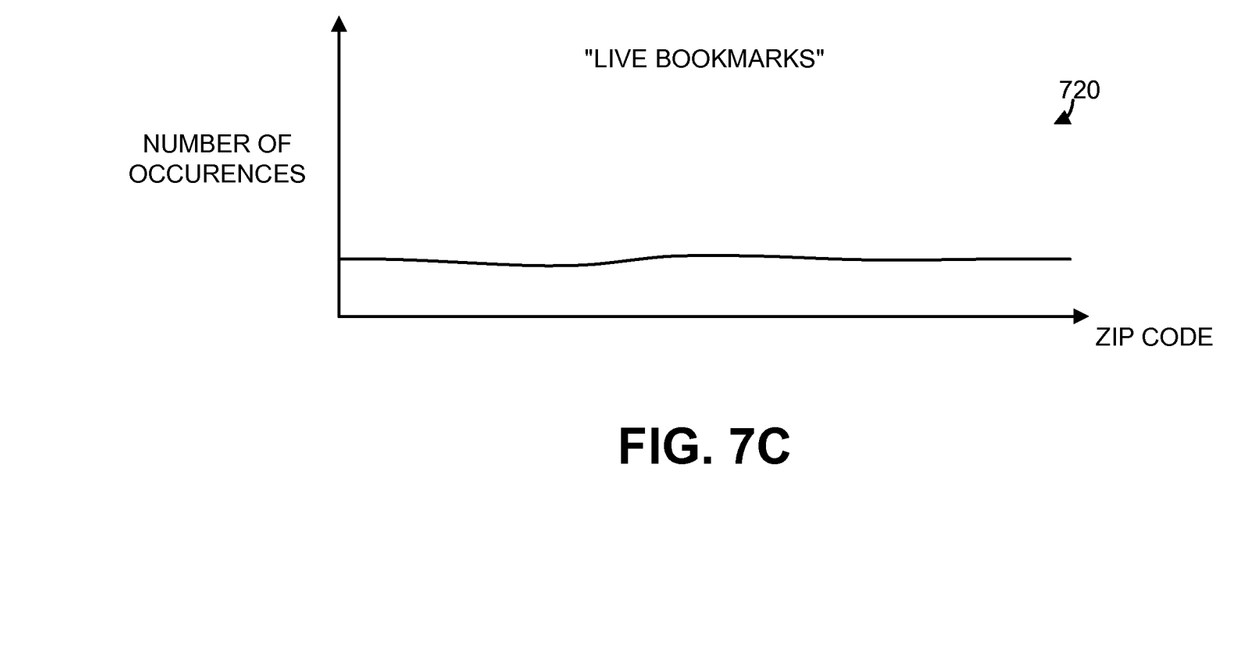

Location classifier 100 may next select and store the generated histograms that correspond to geographically relevant terms/phrases (acts 408 and 409). The stored histograms act as geo-relevance profiles for the terms/phrases. Many of the terms/phrases for which histograms are generated in act 407 may not be geographically relevant. FIG. 7C is a diagram of an exemplary histogram 720 for the for the bi-gram "live bookmarks." This phrase is not geographically relevant, and accordingly, the histogram is relatively flat. Histograms 700 and 710, however, include statistically significant spikes that indicate that these terms/phrases may be relevant to a particular geographic location. One of ordinary skill in the art will recognize that a number of known techniques could be used to determine whether a histogram includes statistically significant peaks.

Acts 408 and 409 may be repeated for a number of terms/phrases in text selections 610 (act 410). In one implementation, location classifier 100 may examine the geographical relevance of every bi-gram present in text selections 610. In other implementations, single terms could be examined for geographical relevance or phrases having three or more terms could be examined.

Figure 8:
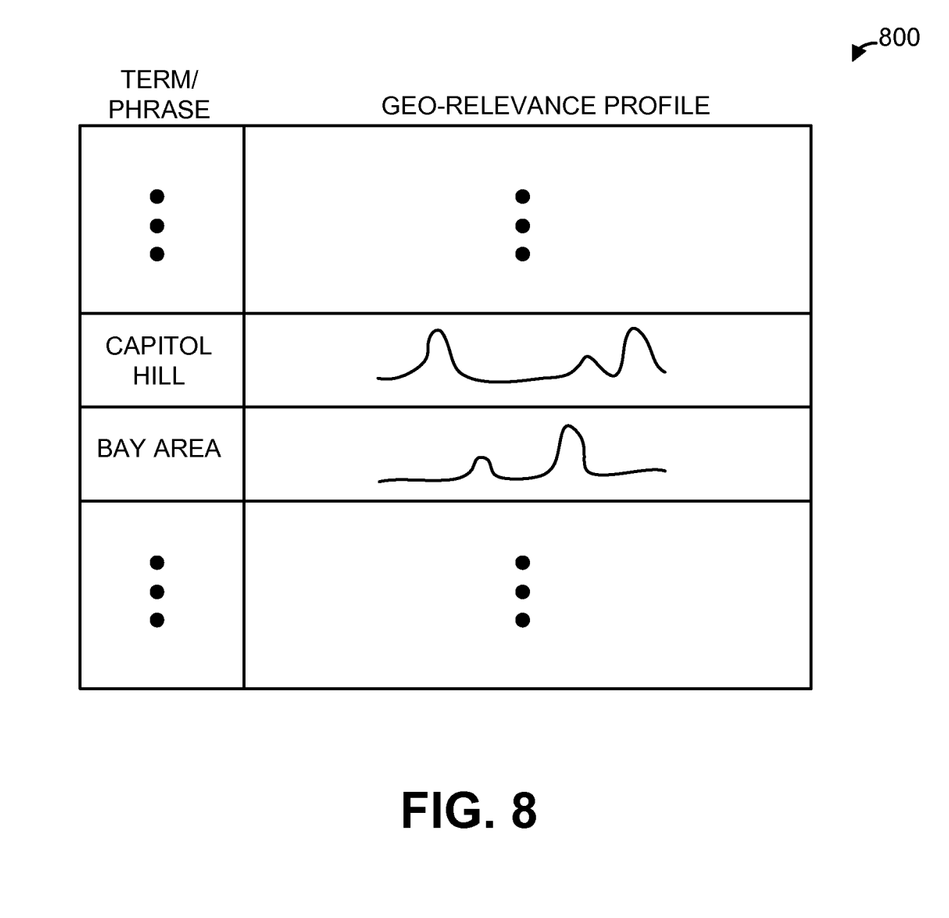
FIG. 8 is a diagram conceptually illustrating a table including exemplary terms/phrases and their corresponding geo-relevance profiles.

As a result of the training shown in FIG. 4, location classifier 100 may store a number (potentially a large number) of terms/phrases and their corresponding geo-relevance profiles. FIG. 8 is a diagram conceptually illustrating a table 800 including exemplary terms/phrases and their corresponding geo-relevance profiles.

In one implementation, the geo-relevance profiles stored in act 409 may be normalized based on the global distribution of zip codes in the training data. In this manner, regions that are frequently mentioned in the training data are not over emphasized in the geo-relevance profiles.

Operation of Location Classifier 100

Figure 9:
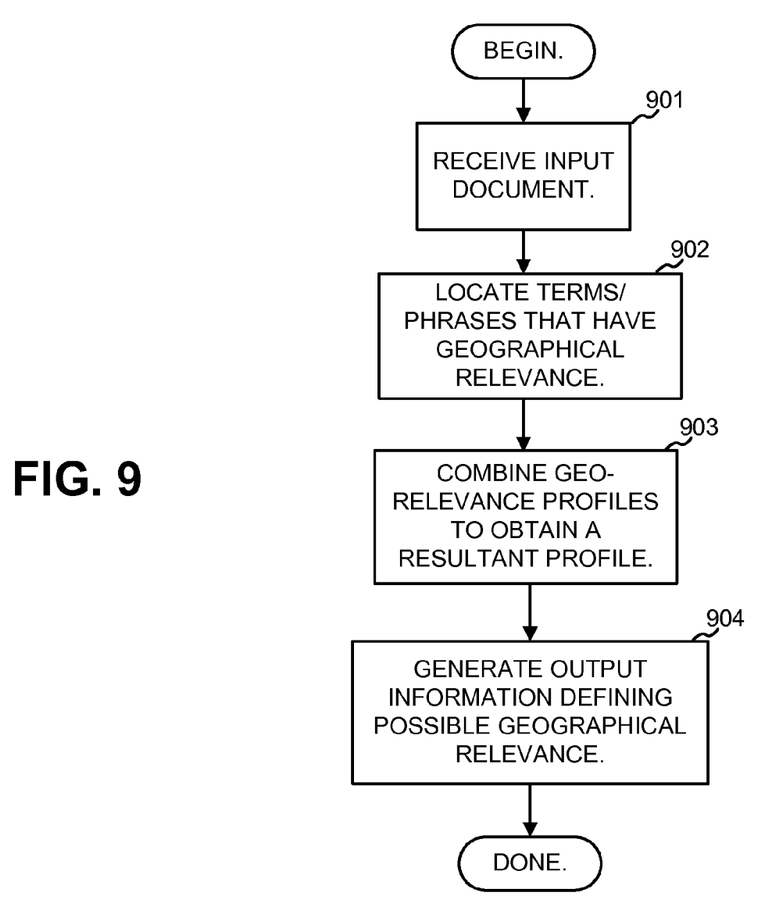
FIG. 9 is a flow chart illustrating exemplary operation of the location classifier in determining potentially relevant geographical areas for input documents.

FIG. 9 is a flow chart illustrating exemplary operation of location classifier 100 in determining potentially relevant geographical areas for input documents.

Location classifier 100 may begin by receiving the input document (act 901). Generally, the input document will be one that includes potentially ambiguous references to locations. The input document may, for example, be a relatively short section of text, such as a search query, or a longer block of text such as a web document. Terms/phrases may be located in the input document that correspond to the terms/phrases stored in table 800 (act 902). In other words, the terms/phrases that were previously determined to have geographical relevance are identified.

Figure 10A:
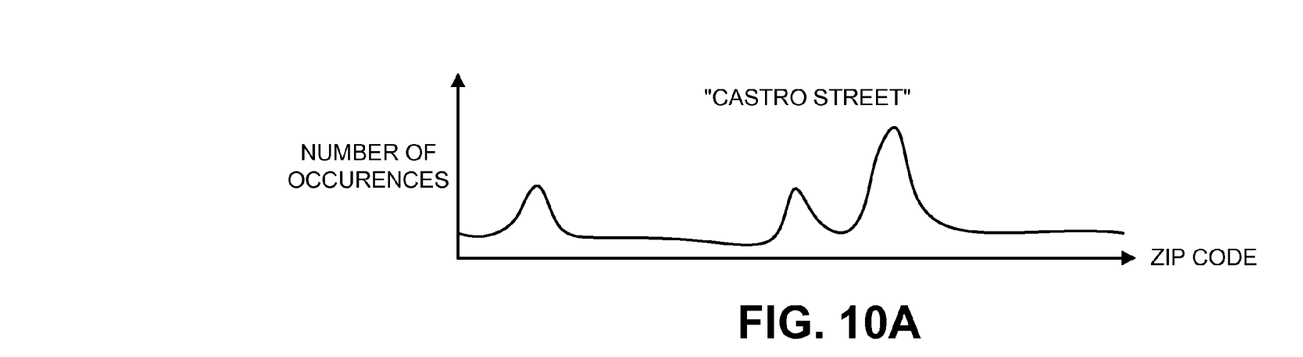
FIGS. 10A-10C illustrate combining multiple geo-relevance profiles to obtain a combined profile.
Figure 10B:
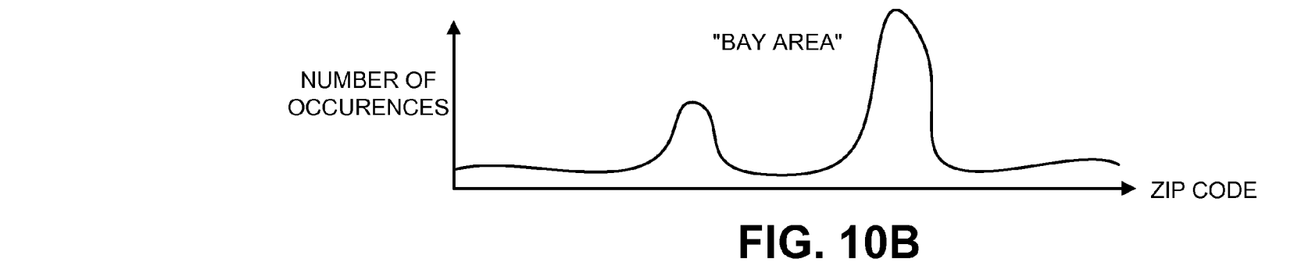
Figure 10C:
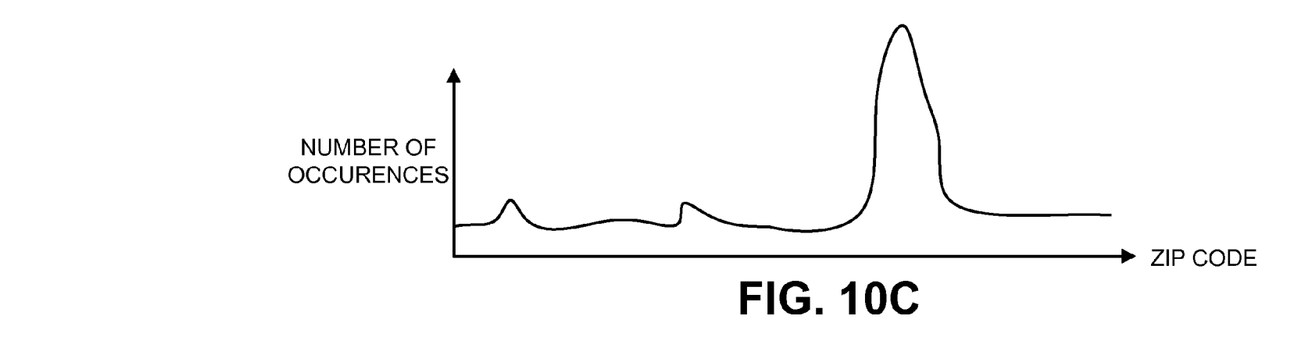

The geo-relevance profiles for each of the identified terms/phrases may next be combined to generate a resultant geo-relevance profile for the input document (act 903). In one implementation, the geo-relevance profiles may be combined by multiplying each of the geo-relevance profiles identified in act 902. That is, for each zip code, the values for each histogram may be multiplied together to obtain a value for that zip code in the resultant histogram. FIGS. 10A-10C illustrate combining multiple geo-relevance profiles to obtain a combined profile. In this example, assume that the input document is a page of text that contains two bi-grams that are present in table 800 (i.e., the input page contains two geo-graphically relevant terms/phrases). The two bi-grams are "Castro Street" and "Bay Area." The geo-relevance profile for Castro Street is shown in FIG. 10A and the geo-relevance profile for Bay Area is shown in FIG. 10B. FIG. 10C illustrates the combined geo-relevance profile. As shown, although the histograms in FIGS. 10A and 10B both include multiple peaks, when combined, the peaks tend to cancel each other except in areas where both profiles indicate geographical relevance. Accordingly, the combined geo-relevance profile of FIG. 10C correctly indicates that the reference to "Castro Street" and "Bay Area" is most likely a reference to the Castro Street located in the Northern California Bay Area.

Based on the combined geo-relevance profile, such as the exemplary profile shown in FIG. 10C, location classifier 100 may generate output information defining potential relevance of the input documents to one or more geographical regions (act 904). The output information may generally be obtained by examining the combined geo-relevance profile for peaks. In the example of FIG. 10C, for instance, the output information may include zip codes of regions that include Castro Street in Northern California. In some implementations, the zip codes may also be associated with values that relate the likeliness or certainty that the area defined by the zip code is correct.

In one implementation, the document received in act 901 may be a partial address, such as a partial address taken from a web page, search query, or other source. The output information may then be used to disambiguate the partial address. For instance, if an address such as "650 Castro Street" is identified in a document without a city or state, the address by itself is not a complete address. If, however, location classifier 100 concludes that the document is relevant to the Mountain View zip code 94043, then the address is unambiguous and can be reduced to an exact geographical location (latitude/longitude).

Exemplary Implementation

Figure 11:
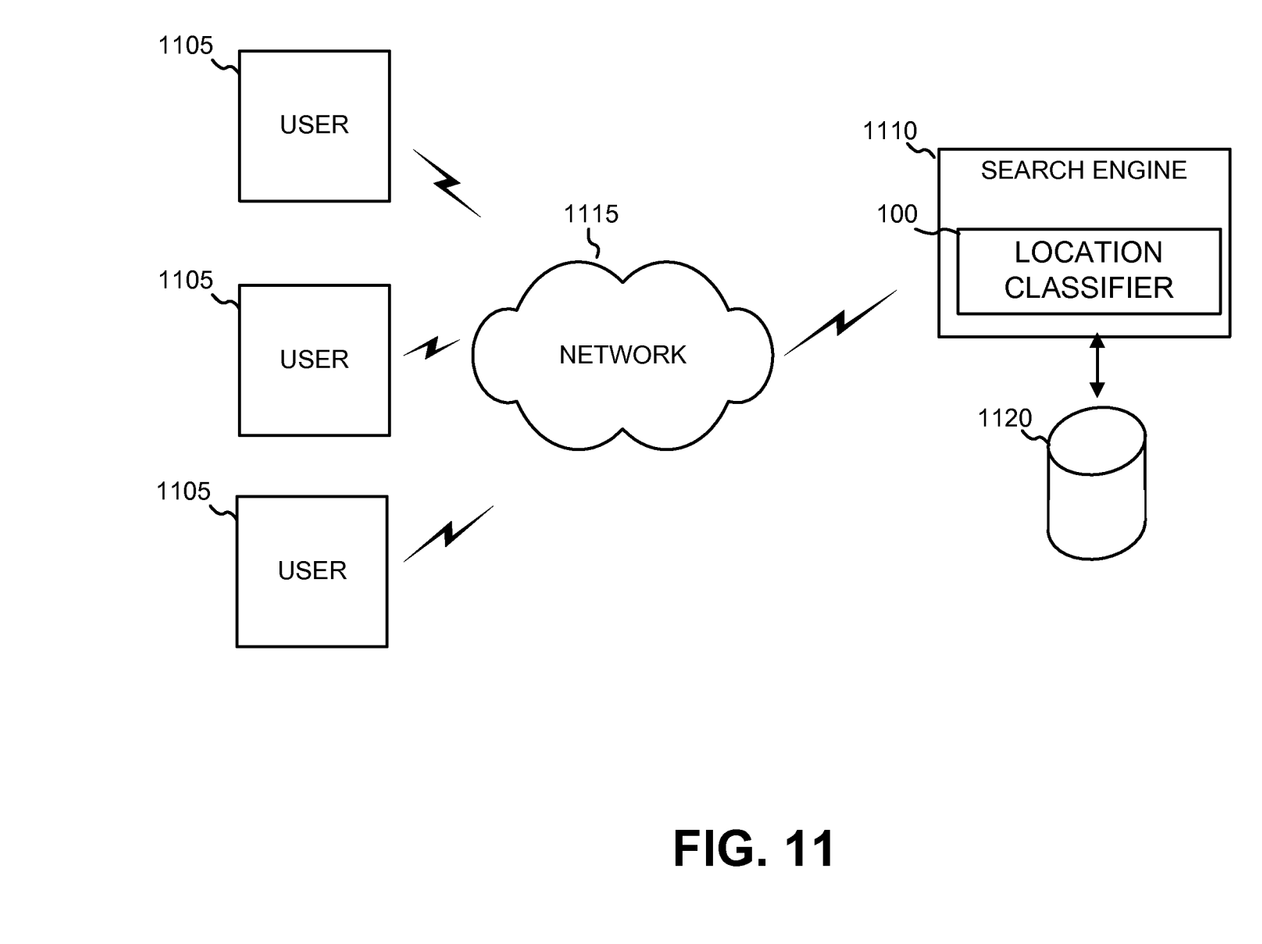
FIG. 11 is a diagram illustrating an exemplary implementation of the location classifier implemented in the context of a search engine.

FIG. 11 is a diagram illustrating an exemplary implementation of location classifier 100 implemented in the context of a search engine. A number of users 1105 may connect to a search engine 1110 over a network 1115, such as the Internet. Search engine 1110 may be a local search engine that returns links to a ranked set of documents, from a database 1120, that are related to a user query that the user intends to apply to a certain geographical region.

Location classifier 100 may assist search engine 1110 in determining the geographical relevance (if any) of the documents in database 1120. In particular, location classifier 100 may geographically classify each of the documents, or portions of the documents, that cannot be otherwise positively identified as being associated with a particular geographic area. This geographic classification information may then be stored in database 1120 as location identifiers with their corresponding documents that search engine 1110 may use in responding to user search queries.

In another possible exemplary implementation, location classifier 100 may operate on the search queries received from users 1105. Location classifier 100 may thus provide geographical relevance information pertaining to a search query. This information may be used to assist search engine 1110 in returning relevant results to the user.

CONCLUSION

As described above, a location classifier generates location information based on terms/phrases in input text. The terms/phrases can include terms/phrases that would normally be considered geographically ambiguous.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders. Additionally, although the location classifier was generally described as being part of a search engine, it should be understood that the search engine may more generally be separate from the location classifier.

No element, act, or instruction used in the present application should be construed as critical or essential to the invention unless explicitly described as such. Also, as used herein, the article "a" is intended to potentially allow for one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method of determining geographical relevance of a document, performed by one or more server devices, the method comprising:
    identifying, by one or more processors associated with the one or more server devices, a plurality of geographically relevant strings in the document;
    retrieving, by the one or more processors, a plurality of histograms respectively associated with the plurality of identified strings, each histogram relating occurrences of a particular identified string to geographic regions;
    combining, by the one or more processors, the plurality of histograms associated with the plurality of identified strings to obtain a combined histogram for the document;
    and
    associating, by the one or more processors, a particular geographic region with the document based on the combined histogram.

2. The method of claim 1, where identifying the plurality of geographically relevant strings in the document includes identifying a particular string associated with a particular histogram that relates occurrences of the particular string to geographic regions, where the particular histogram includes statistically significant peaks.

3. The method of claim 1, where the document includes a search query.

4. The method of claim 3, further comprising:
    performing a local search of documents associated with the particular geographic region using the search query.

5. The method of claim 1, where the document includes a web page.

6. The method of claim 1, where the document includes a partial address.

7. The method of claim 6, where the partial address includes a street name and does not include a postal code, a city name, or a state name.

8. The method of claim 1, where the geographic regions include postal codes.

9. The method of claim 1, where combining the plurality of histograms includes multiplying together corresponding values of the retrieved plurality of histograms.

10. The method of claim 1, where associating the particular geographic region with the document includes:
    analyzing the combined histogram for peaks;
    selecting a highest peak of the combined histogram; and
    identifying a geographic region corresponding to the highest peak as the particular geographic region.

11. A system comprising:
    one or more server devices to:
        identify a plurality of geographically relevant strings in the document;
        retrieve a plurality of histograms respectively associated with the plurality of identified strings, each histogram relating occurrences of a particular identified string to geographic regions;
        combine the plurality of histograms associated with the plurality of identified strings to obtain a combined histogram for the document; and
        associate a particular geographic region with the document based on the combined histogram.

12. The system of claim 11, where, when identifying the plurality of geographically relevant strings in the document, the one or more server devices are further to identify a particular string associated with a particular histogram that relates occurrences of the particular string to geographic regions, where the particular histogram includes statistically significant peaks.

13. The system of claim 11, where the document includes a search query.

14. The system of claim 13, where the one or more server devices are further to:
    perform a local search of documents associated with the particular geographic region using the search query.

15. The system of claim 11, where the document includes a web page.

16. The system of claim 11, where the document includes a partial address.

17. The system of claim 16, where the partial address includes a street name and does not include a postal code, a city name, or a state name.

18. The system of claim 11, where the geographic regions include postal codes.

19. The system of claim 11, where, when combining the plurality of histograms, the one or more server devices are further to:
    multiply together corresponding values of the retrieved plurality of histograms.

20. The system of claim 11, where, when associating the particular geographic region with the document, the one or more server devices are further to:
    analyze the combined histogram for peaks;
    select a highest peak of the combined histogram; and
    identify a geographic region corresponding to the highest peak as the particular geographic region.

* * * * *